Patented Feb. 22, 1938

2,108,887

UNITED STATES PATENT OFFICE 2,108,887

SULPHAMIC ACID SUBSTANCE

Fritz Guenther and Hermann Holsten, Ludwigshafen-on-the-Rhine, Germany, assignors to I. G. Farbenindustrie Aktiengesellschaft, Frankfort-on-the-Main, Germany No Drawing. Application November 14, 1935, Serial No. 49,842. In Germany April 28, 1930

14 Claims. (Cl. 260—124)

This application is a continuation-in-part to our application Ser. No. 532,992, filed on April 25th, 1931.

The present invention relates to the production of assistants for the textile and related industries.

We have found that valuable wetting, cleansing and dispersing agents as well as auxiliary agents for all branches of the textile and leather industries can be obtained when carboxylic amides containing at least one aliphatic, i. e. open chain or cycloaliphatic, radicle having more than 8 carbon atoms connected with a nitrogen atom in so far as they contain at least one hydrogen atom attached to the nitrogen atom of the amido group, are converted into sulphamic acids (=N—SO₂OH), or their water-soluble salts respectively. The amides employed may be substituted, for example by carboxyl, hydroxyl, aryl, tertiary amino groups or halogen. The reaction may be effected by sulphonating the amides according to the usual methods for the preparation of sulphamic acids. The usual sulphonating agents stronger than sulphuric acid, such as oleum, sulphur trioxide, chlorsulphonic acid and sulphuryl chloride, if desired with the addition of substances removing water or hydrogen halides, such as organic or inorganic anhydrides as for example acetic or phosphoric anhydrides, may be employed. Mixtures of concentrated sulphuric acid with one or more of the aforesaid anhydrides may also be employed. The coemployment of organic diluents inert to the sulphonating agents and amides under the conditions of working, such as diethyl ether, trichlorethylene, chloroform, or especially of tertiary bases, such as trialkyl amines, pyridine, dimethylaniline and the like, as such or in conjunction with the aforesaid solvents renders it possible to carry out the reaction with good yields and under especially mild conditions, such as below 80° C. so as to avoid losses by oxidation and decomposition. The sulphonation of the amides can be carried out in the presence of tertiary bases in order to avoid the formation of products in which the sulphur is connected to a carbon atom. When employing sulphuryl chloride, the reaction products first formed, such as sulphamic chlorides or sulphamides, must be converted by hydrolysis into the free acids or their salts. The amount of sulphonating agent in cases when the compound to be sulphonated contains double linkages, hydroxyl groups or aromatic radicles should be so selected that in so far as a sulphonation on a carbon or oxygen atom can take place under the reaction conditions chosen, a quantity of sulphonating agent is present which exceeds that reacting with the said groups and suffices to form the sulphamic acid. If materials containing unsaturated radicles are to be sulphonated the sulphonation is effected with advantage in the presence of tertiary bases whereby the formation of such products as contain the sulphur connected to a carbon atom is suppressed; in this case the sulphonation can often be effected in an advantageous manner by means of fluorosulphonic acid.

Products which are especially suitable as washing and cleansing agents are obtained when the high molecular fatty acids contained in vegetal fats, i. e. vegetable or animal solid or liquid fats, are converted into acid amides or when acid amides which contain tertiary amino groups, such as N-monopalmitoyl N'.N'-diethyl ethylene diamine (R—CO₈—NH—C₂H₄—N(C₂H₅)₂) are converted into sulphamic acids in the manner described so that chains of from 10 to 18 carbon atoms are connected to a nitrogen atom. Compounds containing tertiary amino groups besides acid amido groups are sulphonated according to the present invention on the amido group in so far as replaceable hydrogen is attached to the amido nitrogen. The lower members of this series containing from 8 to 12 carbon atoms yield excellent wetting and penetrating agents. Similar products may also be obtained by introducing high molecular organic radicles, as for example suitable acyl radicles, into the sulphamic acids of low molecular compounds as for example ethyl sulphamic acid.

The acid amides of mixed aromatic-aliphatic carboxylic acids containing at least 8 carbon atoms in a non-aromatic chain as for example phenyl stearic acid

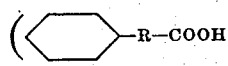

obtainable from benzene and oleic acid with the aid of aluminium chloride), or resinic and naphthenic acids and also those of carboxylic acids from the destructive oxidation of paraffin wax with the aid of oxygen, nitrogen oxides or nitric acid give valuable products. The products obtained are valuable auxiliary agents for the industries which work up textiles and other fibrous materials as well as for all other purposes of industrial and daily use in which use is made of wetting, cleansing and emulsifying power.

The sulphamic acids obtained may be employed alone or together with other wetting, cleansing and emulsifying agents, such as soaps, products similar to Turkey red oil, salts of sulphonic acids of aromatic and aliphatic nature, as for example alkylated naphthalene sulphonic acids, sulphonic acids from mineral oils, fatty acids, sulphonic acids from fats of vegetable and animal fats or oils or alcohols, such as cetyl or dodecyl alcohols, or sulphuric esters of higher fatty alcohols, as for example of cetyl or dodecyl alcohols or the alcohols obtainable by reducing the carboxyl groups of acids of vegetable or animal fats or oils or of the glycerides, with high molecular amines, such as dodecyl or pentadecyl amines, with hydroxyalkylamines, as for example ethanol, N-dodecyl N-ethanol or like amines, quaternary ammonium bases and their salts, such as trimethyl dodecyl ammonium sulphate or N-dimethyl N-ethanol N-dodecyl ammonium sulphate, or in conjunction with organic solvents, such as methyl cyclohexanol, tetrahydronaphthalene, ethylene glycol cresyl ether, trichlorethylene, or with protective colloids, such as glue, gelatine, starch, and vegetable mucilages, or with salts, such as sodium carbonate, sodium bicarbonate, waterglass, common salt, phosphates, such as sodium pyrophosphate or sodium metaphosphate, Glauber's salt, or bleaching agents, such as perborates, percarbonates, paratoluene sulpho-chloramide sodium salt and the like. The addition of the said agents depends on the purpose in view. Preparations which contain several of the said additions may frequently be employed with advantage. Instead of the free sulphamic acids their salts with alkalies, such as alkali metals, ammonia or organic bases, such as methylamine, monoethanolamine, pyridine and aniline, may also be employed.

The following examples will further illustrate the nature of this invention but the invention is not restricted to these examples. The parts are by weight.

*Example 1*

24 parts of chlorsulphonic acid are slowly introduced into 75 parts of pyridine at from 10° to 15° C. while stirring and cooling. A mixture of 50 parts of palmitic amide warmed to about 60° C. and 100 parts of pyridine is then allowed to flow in and the mixture is heated for about 3 hours at about 75° C. and then poured into 500 parts of water. Dilute caustic soda solution is then added, the whole stirred for some time, the solid sodium salt formed filtered off by suction and washed with an about 5 per cent solution of common salt. The product obtained is dried at low temperatures, preferably in vacuo. It corresponds to the formula $$CH_3-(CH_2)_{14}-\overset{O}{\underset{\|}{C}}-NH-SO_3Na$$

Instead of palmitic acid amide the amides of other fatty acids or mixtures of fatty acids may be employed, for example, the amides of the fatty acids of palm kernel oil, train oil and the like. Methylamides of the fatty acids of coconut oil, palm kernel oil and the like may be used in an analogous manner.

Instead of preparing the sodium salt as described in the first paragraph of the present example, the sulphonated mixture may be worked up by distilling off free pyridine in vacuo. The readily soluble pyridine salt thus obtained foams very strongly and is suitable for wetting and washing textiles and like materials. If 2 grams of this product are added per each liter of a bath for treating textiles a very rapid and uniform wetting of the goods to be treated is obtained.

Instead of starting with palmitic amide the equivalent amount of dichlorstearic amide may be employed. If instead of palmitic amide palmitic monoethanol amide is employed in view of the presence of the sulphonatable hydroxyl group a correspondingly higher amount of chlorosulphonic acid is required.

*Example 2*

10 parts of methyl amido-sulphonic acid ($CH_3-NH-SO_3H$) are suspended in 100 parts of pyridine and 25 parts of palmitic acid chloride are added; after stirring for 2 hours at room temperature the reaction mixture is diluted with 250 parts of hot water, whereby a clear solution is obtained from which the sodium salt of the sulphamic acid can be crystallized after adding caustic soda solution. The salt is filtered off by suction and is dried.

Instead of the palmitic acid chloride, other carboxylic acid chlorides may be employed as for example the chlorides of oleic, naphthenic or phenylstearic acids.

*Example 3*

50 parts of naphthenic amide are dissolved in 100 parts of dimethylaniline and stirred with 50 parts of chlorosulphonic acid. After stirring for one hour at from 50° to 55° C. the viscous reaction product is stirred into a quantity of aqueous caustic soda solution exceeding that required for complete neutralization. Dimethylaniline is then separated and the sodium salt of the sulphamic acid is salted out, filtered by suction and dried. It corresponds to the formula $R.CO.NH.SO_3Na$ (wherein $R.CO-$ is the acyl radicle of naphthenic acid). 50 parts of the salt are dissolved in 200 parts of water and 50 parts of cyclohexanol are stirred into the solution. If 5 parts of the emulsion are diluted with 250 parts of water a clear solution is obtained which possesses a good power for wetting textiles and can be advantageously employed for degreasing and cleansing.

*Example 4*

50 parts of the amide corresponding to the formula

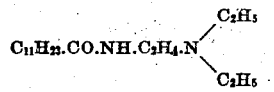

(obtainable by condensing lauric acid chloride with as-diethyl-ethylenediamine) are dissolved in 100 parts of pyridine and sulphonated at about 50° C. by means of a solution of 30 parts of chlorosulphonic acid in 100 parts of pyridine. The reaction mass is poured onto ice, neutralized with caustic soda solution, salted out and filtered off by suction. The product which corresponds to the formula

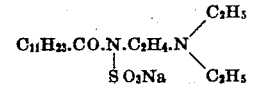

has an excellent wetting power.

Instead of the above amide the corresponding amides derived from the fatty acids of palm kernel oil, coconut oil, train oil and the like and from as-dimethyl-ethylene diamine or as-dimethyl propylene diamine may be employed with a similar result. The corresponding sulphamic acids thus obtained have similar properties as the sulphamic acid shown in the above formula.

What we claim is:—

1. A sulphamic acid substance derived by substitution of a —SO₃X group, wherein X is a substituent selected from the group consisting of hydrogen and a salt-forming radicle, for a hydrogen atom in the amido group of an organic carboxylic acid amide containing at least one aliphatic radicle with at least 8 carbon atoms.

2. A sulphamic acid substance derived by substitution of a —SO₃X group, wherein X is a substituent selected from the group consisting of hydrogen and a salt-forming radicle, for a hydrogen atom in the amido group of an organic carboxylic acid amide containing at least one aliphatic radicle with from 8 to 18 carbon atoms.

3. A sulphamic acid substance derived by substitution of a —SO₃X group, wherein X is a substituent selected from the group consisting of hydrogen and a salt-forming radicle, for a hydrogen atom in the amido group of an amide of a fatty acid of vegetal origin.

4. A sulphamic acid substance derived by substitution of a —SO₃X group, wherein X is a substituent selected from the group consisting of hydrogen and a salt-forming radicle, for a hydrogen atom in the amido group of an organic carboxylic acid amide containing at least one aliphatic radicle with at least 8 carbon atoms which acid amide is selected from the class consisting of unsubstituted acid amides and acid amides substituted by at least one of the substituents carboxyl, hydroxyl, aryl, tertiary amino groups and halogen.

5. Sulphamic acid substances corresponding to the general formula

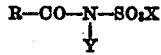

wherein R stands for an aliphatic radicle with at least 8 carbon atoms, Y stands for a member selected from the class consisting of hydrogen atoms and organic radicles and X stands for a substituent selected from the group consisting of hydrogen and a salt-forming radicle.

6. Sulphamic acid substances corresponding to the general formula R—CO—NH—SO₃Na, wherein R stands for an aliphatic radicle with at least 8 carbon atoms.

7. Sulphamic acid substances corresponding to the general formula R—CO—NH—SO₃Na, wherein R—CO— stands for the radicles of the fatty acids occurring in palm kernel oil.

8. Sulphamic acid substances corresponding to the general formula

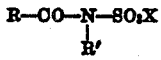

wherein R stands for an aliphatic radicle with at least 8 carbon atoms, R' stands for a low molecular aliphatic radicle and X stands for a substituent selected from the group consisting of hydrogen and a salt-forming radicle.

9. Sulphamic acid substances corresponding to the general formula

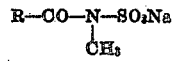

wherein R stands for an aliphatic radicle with at least 8 carbon atoms.

10. Sulphamic acid substances corresponding to the general formula

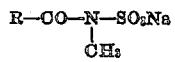

wherein R—CO— stands for the radicles of the fatty acids occurring in natural fats.

11. Sulphamic acid substances corresponding to the general formula

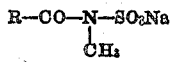

wherein R—CO— stands for the radicles of the fatty acids occurring in palm kernel oil.

12. Sulphamic acid substances corresponding to the general formula

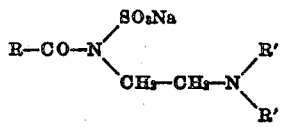

wherein R stands for an aliphatic radicle with at least 8 carbon atoms and R' stands for a low molecular aliphatic radicle.

13. Sulphamic acid substances corresponding to the general formula

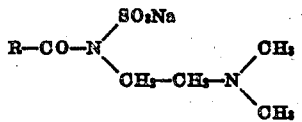

wherein R—CO— stands for the radicles of the fatty acids occurring in natural fats.

14. Sulphamic acid substances corresponding to the general formula

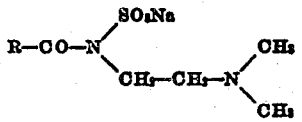

wherein R—CO— stands for the radicles of the fatty acids occurring in palm kernel oil.

FRITZ GUENTHER.
HERMANN HOLSTEN.